United States Patent
Chen et al.

(10) Patent No.: US 10,242,296 B2
(45) Date of Patent: Mar. 26, 2019

(54) METHOD AND DEVICE FOR REALIZING CHINESE CHARACTER INPUT BASED ON UNCERTAINTY INFORMATION

(71) Applicant: SAMSUNG ELECTRONICS CO., LTD., Suwon-si (KR)

(72) Inventors: Youxin Chen, Beijing (CN); Jie Wu, Beijing (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/607,601

(22) Filed: Jan. 28, 2015

(65) Prior Publication Data

US 2015/0213333 A1    Jul. 30, 2015

(30) Foreign Application Priority Data

Jan. 28, 2014 (CN) .......................... 2014 1 0041504

(51) Int. Cl.
*G06K 9/00* (2006.01)
*G06K 9/72* (2006.01)
(Continued)

(52) U.S. Cl.
CPC .............. *G06K 9/72* (2013.01); *G06F 3/018* (2013.01); *G06F 3/04883* (2013.01); *G06K 9/6842* (2013.01); *G06K 2209/013* (2013.01)

(58) Field of Classification Search
CPC .. G06K 9/00852–9/00879; G06K 9/72; G06K 9/6842; G06K 2209/01–2209/015; G06F 3/04883; G06F 3/018
See application file for complete search history.

(56) References Cited

U.S. PATENT DOCUMENTS 6,292,768 B1 * 9/2001 Chan ...................... G06Q 40/02
                                                                704/1
6,822,585 B1 * 11/2004 Ni ........................ G06F 3/0237
                                                                341/22
(Continued)

FOREIGN PATENT DOCUMENTS

CN           1577228 A       2/2005
CN         101369209 A       2/2009
(Continued)

OTHER PUBLICATIONS

Communication dated Apr. 6, 2017 by the State Intellectual Property Office of P.R. China in counterpart Chinese Patent Application No. 201410041504.8.

(Continued)

*Primary Examiner* — Aaron W Carter
(74) *Attorney, Agent, or Firm* — Sughrue Mion, PLLC

(57) ABSTRACT

The present invention provides a method and device for realizing Chinese character input based on uncertainty information, wherein the method comprises: receiving input information from a user; extracting at least two types of uncertainty information of Chinese characters to be input, from the input information; and, determining the matched Chinese characters according to the at least two types of uncertainty information and outputting the matched Chinese character(s). The device comprises a receiving module, an extracting module and a matching module. The method and device as provided by the present invention allow a user who has incomplete memory of pronunciation or glyph information of Chinese characters to be input to realize correct input of the Chinese characters by defining a certain range for candidate characters corresponding to the Chinese characters to be input, in combination with at least two types of the (Continued)

extracted uncertainty information of the Chinese characters to be input.

18 Claims, 8 Drawing Sheets

(51) Int. Cl.
*G06F 3/01* (2006.01)
*G06F 3/0488* (2013.01)
*G06K 9/68* (2006.01)

(56) References Cited

U.S. PATENT DOCUMENTS

| | | | | |
|---|---|---|---|---|
| 6,848,080 | B1* | 1/2005 | Lee | G06F 17/2223 704/9 |
| 7,013,258 | B1* | 3/2006 | Su | G06F 3/013 345/171 |
| 7,165,019 | B1* | 1/2007 | Lee | G06F 17/2715 704/10 |
| 7,257,528 | B1* | 8/2007 | Ritchie | G06F 3/0236 341/28 |
| 2002/0069058 | A1* | 6/2002 | Jin | G06F 3/018 704/249 |
| 2003/0020738 | A1* | 1/2003 | Milburn | G06F 3/018 715/700 |
| 2005/0027524 | A1* | 2/2005 | Wu | G10L 15/187 704/235 |
| 2005/0027534 | A1* | 2/2005 | Meurs | G06K 9/723 704/270 |
| 2005/0209844 | A1* | 9/2005 | Wu | G06F 17/2223 704/2 |
| 2005/0222838 | A1* | 10/2005 | Gong | G06F 17/2223 704/5 |
| 2005/0289463 | A1* | 12/2005 | Wu | G06F 17/273 715/257 |
| 2006/0048055 | A1* | 3/2006 | Wu | G06F 17/273 715/262 |
| 2006/0248459 | A1* | 11/2006 | Su | G06F 3/018 715/703 |
| 2009/0132231 | A1* | 5/2009 | O'Dell | G06F 3/018 704/2 |
| 2009/0187399 | A1* | 7/2009 | O'Dell | G06F 3/018 704/8 |
| 2010/0063798 | A1* | 3/2010 | Ku | G06F 17/2863 704/9 |
| 2010/0125449 | A1* | 5/2010 | Hsu | G06F 17/2223 704/8 |
| 2010/0309137 | A1* | 12/2010 | Lee | G06F 3/018 345/171 |
| 2011/0320468 | A1* | 12/2011 | Child | G06F 17/2223 707/756 |
| 2012/0089632 | A1* | 4/2012 | Zhou | G06F 3/0237 707/769 |
| 2012/0259614 | A1* | 10/2012 | De Bruyn | G06F 17/2863 704/3 |
| 2013/0041647 | A1* | 2/2013 | Ramerth | G06F 17/2863 704/2 |
| 2013/0093668 | A1* | 4/2013 | Kim | H04W 4/12 345/156 |
| 2013/0136377 | A1* | 5/2013 | Luo | G06T 5/00 382/275 |
| 2013/0147809 | A1* | 6/2013 | Luo | G09G 5/28 345/472.3 |
| 2015/0213333 | A1* | 7/2015 | Chen | G06K 9/72 382/185 |

FOREIGN PATENT DOCUMENTS

| | | |
|---|---|---|
| CN | 101408808 A | 4/2009 |
| CN | 102221976 A | 10/2011 |
| CN | 102298449 A | 12/2011 |
| CN | 102346558 A | 2/2012 |
| CN | 102629158 A | 8/2012 |
| CN | 102750000 A | 10/2012 |
| KR | 10-0667533 B1 | 1/2007 |
| KR | 10-0886687 B1 | 3/2009 |

OTHER PUBLICATIONS

Communication dated Oct. 10, 2017 by the State Intellectual Property Office of P.R. China in counterpart Chinese Patent Application No. 201410041504.8.

Communication dated Apr. 10, 2018 by the State Intellectual Property Office of P.R. China in counterpart Chinese Patent Application No. 201410041504.8.

Office Action dated Dec. 11, 2018 in the Chinese Patent Office in corresponding Chinese Patent Application No. 201410041504.8.

* cited by examiner

METHOD AND DEVICE FOR REALIZING CHINESE CHARACTER INPUT BASED ON UNCERTAINTY INFORMATION

CROSS-REFERENCE TO RELATED PATENT APPLICATION

This application claims the benefit of Chinese Patent Application No. 201410041504.8, filed on Jan. 28, 2014, in the Chinese Intellectual Property Office, the disclosure of which is incorporated herein in its entirety by reference.

BACKGROUND

1. Field

The present invention refers to technical field of terminal devices, in particular, to method and device for realizing Chinese character input based on uncertainty information.

2. Description of the Related Art

The Chinese character is known as its complex strokes, and the modern people are more and more unfamiliar with the glyph due to the widely used Pinyin input system provided by mobile devices, which frequently causes problems of character amnesia. Although the handwriting input system supports functions of listing the expected, correct characters in the options for users who input incorrect characters with a similar glyph, sometimes it may be difficult to immediately recall even a rough profile for some common Chinese characters such as "犄角旮旯" and "饕餮".

According to the existing technology, some supplementary means, such as utilizing auxiliary information or exchanging prior knowledge with system, are adopted for inputting Chinese characters, apart from directly writing the correct character.

For those Chinese characters of which the particular glyphs cannot be recalled, people may still remember the corresponding pronunciation and tone, or remember the corresponding type of its structural configuration, or remember a certain radical of those characters only, or remember the pronunciation of a corresponding character only and hence can just input a homophone because the Chinese phonetic alphabet (Pinyin) system used by HK or Taiwan citizens is different from that of the mainland or because some old people had not learned about the Chinese phonetic alphabet. All the information above is referred to as uncertainty information.

The input method of prior art usually realizes Chinese character input by means of a single type of information such as the phonetic alphabet or the glyph, a user therefore cannot finish inputting a corresponding Chinese character based on incomplete memory of the Chinese character or its phonetic alphabet information.

SUMMARY

The present invention provides a method and device for realizing Chinese character input based on uncertainty information, which can solve the problem of difficulty in correct input of Chinese characters input based on incomplete memory of phonetic alphabet or glyph information for the Chinese characters to be input, by means of at least two types of uncertainty information as provided by the user who are inputting Chinese characters.

In order to solve the above problem existed in the prior art, the embodiments of the present invention, on one aspect, provide a method for realizing Chinese character input based on uncertainty information, comprising steps of:

receiving input information from a user;

extracting at least two types of uncertainty information of Chinese characters to be input, from the input information; and determining the matched Chinese characters according to the at least two types of uncertainty information and outputting the matched Chinese characters.

The embodiments of the present invention, on another aspect, provide a method for realizing Chinese character input based on uncertainty information, comprising steps of:

receiving input information from a user;

extracting uncertainty information of Chinese characters to be input, from the input information, wherein the uncertainty information includes any one or more types of the following information:

tone information, structural configuration information, radical information, homophone information, and location information; and, determining and outputting the Chinese characters to be input based on the determined Chinese characters and the uncertainty information.

The embodiments of the present invention, on yet another aspect, provide a device for realizing Chinese character input based on uncertainty information, comprising a receiving module, an extracting module and a matching module:

the receiving module is configured for receiving input information from a user;

the extracting module is configured for extracting at least two types of uncertainty information of Chinese characters to be input, from the input information; and the matching module is configured for determining the matched Chinese characters according to the at least two types of uncertainty information and outputting the matched Chinese characters.

The embodiments of the present invention, on still another aspect, provide a device for realizing Chinese character input based on uncertainty information, comprising a receiving module, an extracting module and a matching module:

the receiving module is configured for receiving input information from a user;

the extracting module is configured for extracting uncertainty information of Chinese characters to be input, from the input information, wherein the uncertainty information includes any one or more types of the following information:

tone information, structural configuration information, radical information, homophone information, and location information; and, the matching module is configured for determining and outputting the Chinese characters to be input based on the determined Chinese characters and the uncertainty information.

The method and device as provided by the present invention allow a user, who has incomplete memory of pronunciation or glyph information of the Chinese characters to be input, to realize correct input of the Chinese characters by defining a certain range for candidate characters corresponding to the Chinese characters to be input, in combination with at least two types of extracted uncertainty information of the Chinese characters to be input. In addition, the above solutions as provided by the present invention just make minor modification to the existing systems, and hence will not influence the system compatibility. Moreover, the implementations of these solutions as provided are both simple and highly effective.

Further aspects and advantageous of the present inventions will be appreciated and become apparent from the descriptions below, or will be well learned from the practice of the present invention.

BRIEF DESCRIPTION OF THE DRAWINGS

The foregoing and/or further aspects and advantageous of the present inventions will become apparent and be well understood from the following descriptions of embodiments, with reference to the accompanying drawings, in which.

DETAILED DESCRIPTION OF THE INVENTION EXEMPLARY EMBODIMENTS

Figure 1:
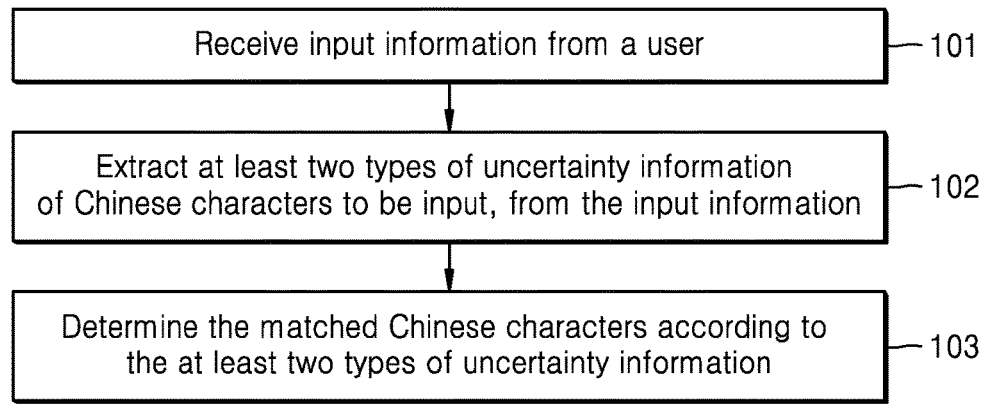
FIG. 1 is a flowchart illustrating a method for realizing Chinese character input based on uncertainty information according to an embodiment of the present invention.

Hereinafter the embodiments of the present invention will be described in details, and the examples of these embodiments have been illustrated in the drawings, in which the identical or similar reference numerals, throughout, refer to the identical or similar elements or elements having identical or similar functions. These examples described by reference to the drawings are illustrative for the purpose of explaining the present invention only, which shall not be regarded as constituting any limitations thereto.

It should be appreciated by the person skilled in the art that, unless particularly specified, the "one", "a (an)", "the (said)" and "this (that)" used herein in single forms also refer to plural forms. It should be further understood that, the wordings "include (comprise)" used in the description refer to the existence of the corresponding features, integers, steps, operations, elements and/or components without excluding the possibility of existing or incorporating one or more other features, integers, steps, operations, elements, components and/or groups thereof. It should be realized that when one element is defined to be "connected" or "coupled" to another element, it can be connected or coupled to another element directly or by an intermediate element. In addition, the "connecting" or "coupling" used herein may contain wireless connecting or coupling. The wording "and/or" used herein include any individual of or all the combinations of one or more related items listed herein.

It should be appreciated by the person skilled in the art that, all the terms used herein (including technical terms and scientific terms), unless otherwise specified, refer to the general meanings well known for those skilled in the art to which the present invention pertains. It should also be understood that, the terms, such as that defined in the general dictionaries, refer to the meanings consistent with the context of the prior art, and shall not be interpreted excessively ideally or formally, unless as specified herein.

It should be appreciated by the person skilled in the art that, the "UE" and "terminal" used herein include both the device provided with only radio signal transceiver incapable of transmitting and the device provided with hardware capable of receiving and transmitting for bidirectional communication on two-way communication links. Such device may include: a cellular or other communication device with or without multiplex display; a PCS that may incorporate functions of speech and data process as well as facsimile and/or data communication; a PDA that may comprise RF receiver and receivers of pager, access of Internet/Intranet, web browser, notepad, calendar and/or GPS; and/or conventional, laptop or palmtop computer or other devices provided with RF receiver. The "UE" and "terminal" used herein may be handheld, transportable, installable in (aero, marine and/or land) communication medias or adaptive and/or configured to operate locally and/or operate in distributed at any other locations on the earth/in the space. The "UE" and "terminal" used herein may also be communication terminal, internet terminal and music/video player terminal, such as PDA, MID (Mobile Internet Device) and/or mobile phones with functions of music/video play. The "UE" and "terminal device" used herein may also be devices such as smart television and set top box.

FIG. 1 is a flowchart illustrating a method for realizing Chinese character input based on uncertainty information according to an embodiment of the present invention. As shown in FIG. 1, the method for realizing Chinese character input based on uncertainty information in the present embodiment comprises steps as below.

Step 101, receiving input information from a user.

As an embodiment of the present invention, the step of receiving input information from a user comprises:

detecting a user operation within an input area;

recording at least two types of uncertainty information input by a user operation.

Step 102, extracting at least two types of uncertainty information of Chinese characters to be input, from the input information.

Specifically, the uncertainty information includes any one type of the following information: phonetic alphabet (Pinyin) information, tone information, structural configuration information, radical information, homophone information, and location information. The phonetic alphabet information includes: phonetic alphabet character string information for separating phonetic alphabet strings according to calligraphy characteristic and writing area of handwriting; and, phonetic alphabet tone information for separating phonetic alphabet tones according to calligraphy characteristic and writing area of the handwriting of phonetic alphabet tone. The structural configuration information is used for separating the structural configuration information according to calligraphy characteristic and writing area of the structural configuration information. The radical information is used for separating radicals which can be determined by the user according to calligraphy characteristic and writing area of the structural configuration information. The homophone information is used for separating the homophone information according to calligraphy characteristic and writing area of the handwriting of homophone.

The tone information includes: information about level tone, rising tone, falling-rising tone, or falling tone. As an embodiment of the present invention, a terminal device receives the tone information by any one of the following ways:

receiving tone symbols input by a user through handwriting corresponding to the tone information, the tone symbols including ´ , or ; and receiving a certain number or letter indicative of the tone information.

For example, numbers 1, 2, 3 and 4 can be preset to represent the level tone, the rising tone, the falling-rising tone and the falling tone, respectively; or letters A, B, C and D can be preset to represent the level tone, the rising tone, the falling-rising tone and the falling tone, respectively.

As an embodiment of the present invention, a terminal device receives the location information by any one of the following ways: receiving a blank or a certain character input by the user. For example, a question mark "?" can be preset to indicate the location information.

In practical implementation, by including the location information of Chinese characters to be input, it facilitates the positioning of the Chinese characters to be input. For example, for a user who has no idea of how to write the third character "嚼" in the phrase "味同嚼蜡", he/she can consecutively input "味同？蜡" by replacing the third character "嚼" with a question mark or a space, in aid of radical information and homophone information in the uncertainty information, he/she can input the correct Chinese characters even based on incomplete memory of pronunciation or glyph information of the Chinese characters to be input.

Step 103, determining the matched Chinese characters according to the at least two types of uncertainty information and outputting the matched Chinese characters.

As an embodiment of the present invention, the step of determining the matched Chinese characters according to the at least two types of uncertainty information and outputting the matched Chinese characters comprises:

determining a priority for the uncertainty information;

matching the Chinese characters to be input in a sequence based on the priority according to the uncertainty information in corresponding models; and, determining Chinese characters with a highest matching degree as the Chinese characters to be input, and outputting the Chinese characters with a highest matching degree.

In the present application scenario, by the step of receiving input information from a user, the step of extracting at least two types of uncertainty information of Chinese characters to be input, from the input information, and the step of determining the matched Chinese characters according to the at least two types of uncertainty information and outputting the matched Chinese characters, it allows a user who just has incomplete memory of pronunciation or glyph information of the Chinese characters to be input to realize correct input of the Chinese characters by defining a certain range for candidate characters corresponding to the Chinese characters to be input, in combination with at least two types of extracted uncertainty information of the Chinese characters to be input, wherein the uncertainty information includes, for example, phonetic alphabet information, tone information, structural configuration information, radical information, homophone information, and location information.

Figure 2:
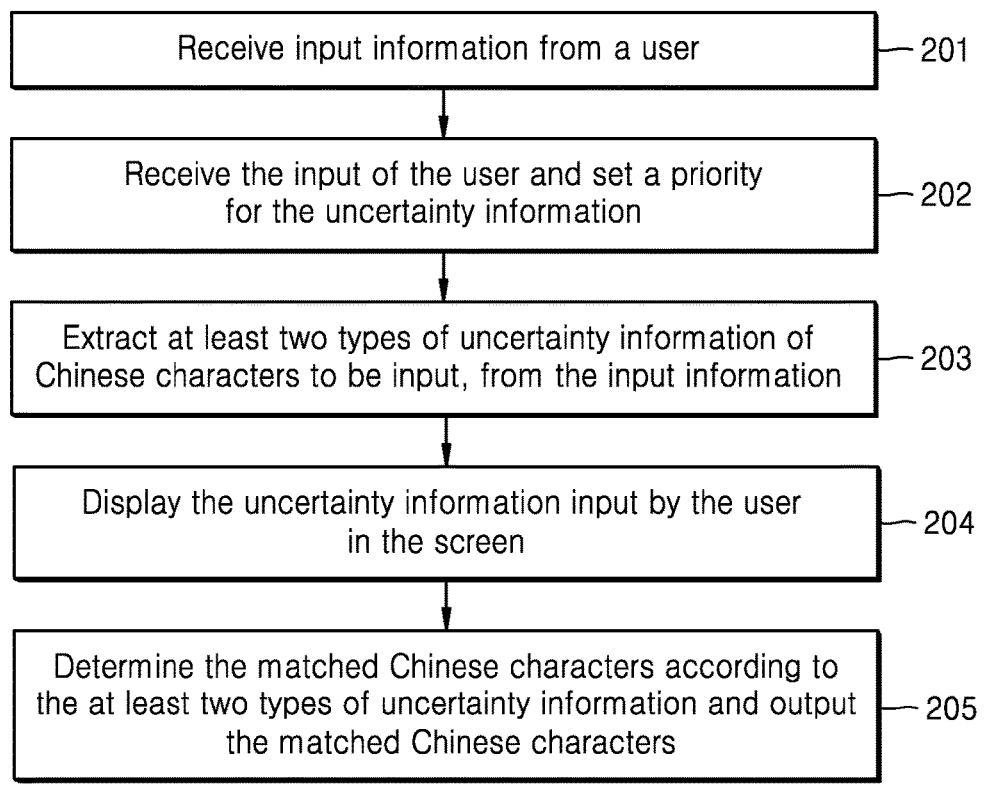
FIG. 2 is a flowchart illustrating a method for realizing Chinese character input based on uncertainty information according to another embodiment of the present invention.

FIG. 2 is a flowchart illustrating a method for realizing Chinese character input based on uncertainty information according to another embodiment of the present invention. As shown in FIG. 2, the method for realizing Chinese character input based on uncertainty information in the present embodiment comprises steps as below.

Step 201, receiving input information from a user.

As an embodiment of the present invention, the step of receiving input information from a user comprises:

detecting a user operation within an input area; and recording at least two types of uncertainty information input by a user operation.

Step 202, receiving the input of the user and setting a priority for the uncertainty information.

Step 203, extracting at least two types of uncertainty information of Chinese characters to be input, from the input information.

Specifically, the uncertainty information includes any one type of the following information: phonetic alphabet (Pinyin) information, tone information, structural configuration information, radical information, homophone information, and location information. The phonetic alphabet information includes: phonetic alphabet character string information for separating phonetic alphabet strings according to calligraphy characteristic and writing area of handwriting; and, phonetic alphabet tone information for separating phonetic alphabet tones according to calligraphy characteristic and writing area of the handwriting of phonetic alphabet tone. The structural configuration information is used for separating the structural configuration information according to calligraphy characteristic and writing area of the structural configuration information. The radical information is used for separating radicals which can be determined by the user according to calligraphy characteristic and writing area of the structural configuration information. The homophone information is used for separating the homophone information according to calligraphy characteristic and writing area of the handwriting of homophone.

Figure 3:
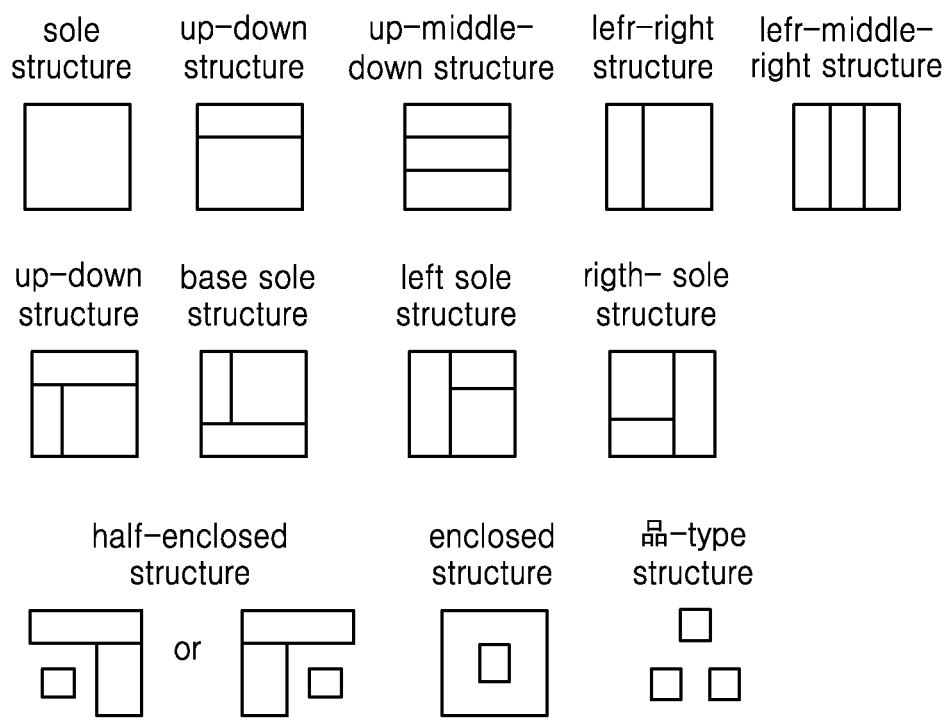
FIG. 3 is a schematic diagram illustrating the category of the structural configuration information in a method for realizing Chinese character input based on uncertainty information according to another embodiment of the present invention.

FIG. 3 is a schematic diagram illustrating the category of the structural configuration information in a method for realizing Chinese character input based on uncertainty information according to another embodiment of the present invention. As shown in FIG. 3, the structural configuration information involved in the present invention can be categorized as below: based on structural characteristics, Chinese characters can be generally categorized into several types in terms of structural configuration, including: sole structure, up-down structure, up-middle-down structure, left-right structure, left-middle-right-structure, up-sole structure, down-sole structure, left-sole structure, right-sole structure, half-enclosed structure, enclosed structure, and a structure formed of three same symbols pyramided.

The "solutions corresponding to the combination of uncertainty information" involved in the present application scenario will be described in details as below.

There may be following eight solutions for input according to the type of uncertainty information that can be provided by a user. It will be more liable to obtain the required Chinese characters quickly and accurately if more information is input into the system and more prior knowledge is thus acquired by the system.

For clarity of description, mapping relations between solution, phonetic alphabet, phonetic alphabet tone, structural configuration, radical and homophone can be established, as particularly shown in Tab. 1.

TABLE 1 mapping relations between solution, phonetic alphabet, phonetic alphabet tone, structural configuration, radical and homophone

| Solution | Phonetic alphabet | Tone | Structural configuration | Radical | Homophone |
|---|---|---|---|---|---|
| Solution 1 | √ | | | | |
| Solution 2 | √ | √ | | | |
| Solution 3 | √ | | √ | | |
| Solution 4 | √ | √ | √ | | |
| Solution 5 | √ | | | | √ |
| Solution 6 | √ | | √ | | √ |
| Solution 7 | √ | | √ | √ | |
| Solution 8 | | | √ | √ | |

Actually, the above eight examples are just common combined solutions that may be used by the users, and there are plenty of other solutions different in combination mode. A single type of uncertainty information, itself, can also constitute a solution independent of others. For example, if the structural configuration information indicated by a "block" is used alone, it may be confused with certain radicals of Chinese characters, which may result in recognizing the structural configuration information, which is of a single type, as a Chinese character by mistake; furthermore, it may lose accuracy for eventually outputting a correct Chinese character when the mistaken Chinese character happens to fit into the context. By the same token, homophones involve the similar problem.

It is preferable to use the radical information along with the structural configuration information, in pairs, so as to define a location of the radical in the character in a better way, and hence to reduce the complexity involved in process for the system.

Step 204, displaying the uncertainty information input by the user on the screen.

In practical application, the embodiment of the present invention differs from the prior art in that it can display uncertainty information input by the user on the screen; for example, it is capable of displaying at least two types of uncertainty information. This is obviously different from the prior art. According to the prior art, only one type of uncertainty information, either phonetic alphabet or glyph information of the Chinese characters to be input, can be extracted. By contrast, the method of Chinese character input as provided by the embodiment of the present invention is capable of providing more than two types of uncertainty information and displaying the same, which allows taking full advantage of the location information of a phrase. For example, when a user, who wants to input the phrase "味同嚼蜡", forgets how to exactly write the character "嚼" but remembers the following information: the location of the forgotten character "嚼" in the context, that is, it is the third character in the phrase; the two characters in front of the forgotten character constitute a sub-phrase in an order of "味" and "同"; and the fourth character in the phrase is "蜡". Such information can be combined with other information concerning the forgotten character such as: its phonetic alphabet is "jiao", it is pronounced at the second tone, it belongs to left-right structure in configuration, it includes a radical "爵" in its right portion, and one of its homophones is "交". In this way, even if a user just has incomplete memory of pronunciation or glyph information of the Chinese characters to be input, he/she can still accurately and conveniently input the expected Chinese characters by means of the more than two types of uncertainty information input by the user and displayed on the screen.

Further, the updated uncertainty information is displayed on the screen when detecting a modification of the uncertainty information by the user within an input area.

In practical application, the embodiment of the present invention differs from the prior art in that it can display the updated uncertainty information on the screen when detecting a modification of the uncertainty information by the user within an input area. This is obviously different from the prior art. According to the prior art, only one type of uncertainty information, either phonetic alphabet or glyph information of the Chinese characters to be input, can be extracted. By contrast, the method for Chinese character input as provided by the embodiment of the present invention is capable of providing more than two types of uncertainty information and meanwhile displaying the updated uncertainty information on the screen when detecting a modification of the uncertainty information by the user within an input area, which allows taking full advantage of the location information of a phrase. For example, when a user, who wants to input the phrase "味同嚼蜡", forgets how to exactly write the character "嚼" but remembers the following information: the location of the forgotten character "嚼" in the context, that is, it is the third character in the phrase; the two characters in front of the forgotten character constitute a sub-phrase in an order of "味" and "同"; and the fourth character in the phrase is "蜡". Such information can be combined with other information concerning the forgotten character such as: its phonetic alphabet is "jiao", it is pronounced at the second tone, it belongs to left-right structure in configuration, it includes a radical "爵" in its right portion, and one of its homophones is "交". In this way, even if a user just has incomplete memory of pronunciation or glyph information of the Chinese characters to be input, he/she can still accurately and conveniently input the expected Chinese characters by means of the more than two types of uncertainty information input by the user and displayed on the screen.

Specifically, for example, when a user, who wants to input the phrase "味同嚼蜡", forgets how to exactly write the character "嚼" but remembers the following information: the location of the forgotten character "嚼" in the phrase, that is, it is the third character in the phrase; the two characters in front of the forgotten character constitute a sub-phrase in an order of "味" and "同"; and the fourth character in the phrase is "蜡". The method can be directed to utilize the location information of the character to be input, comprising:

if the uncertainty information includes two types of information, the information to be combined is that: it is the third character, and its phonetic alphabet is "jiao";

if the uncertainty information includes three types of information, the information to be combined is that: it is the third character, its phonetic alphabet is "jiao", and it is pronounced at the second tone; and if the uncertainty information includes four types of information, the information to be combined is that: it is the third character, its phonetic alphabet is "jiao", it is pronounced at the second tone, and it belongs to left-right structure in configuration.

As above, it can be seen that, including more types of uncertainty information can narrow the collection of candidate characters determined from the uncertainty information as far as possible, so as to narrow the number of phrases constituted by said character and the context, and to reduce the computation time for the language model to analyze, thereby improving the calculation accuracy. Consequently, quick and convenient input of Chinese character, of which the particular glyph or phonetic alphabet is uncertain, can be realized.

By displaying the updated uncertainty information on the screen when detecting a modification of the uncertainty information by the user within an input area, the method for Chinese character input as provided by the embodiment of the present invention possesses improvement in both practicality and operability.

Step 205, determining the matched Chinese characters according to the at least two types of uncertainty information and outputting the matched Chinese characters.

As an embodiment of the present invention, the step of determining the matched Chinese characters according to the at least two types of uncertainty information and outputting the matched Chinese characters comprises:

selecting corresponding models according to the at least two types of uncertainty information;

matching the Chinese characters to be input in at least two types of corresponding models;

analyzing matching results for each of the at least two types of corresponding models to determine Chinese characters with a highest matching degree as the Chinese characters to be input; and, outputting the Chinese character with a highest matching degree.

As an embodiment of the present invention, further comprising steps of:

determining a priority for the uncertainty information; and matching the Chinese character to be input in a sequence according to the priority, in the corresponding model.

As an embodiment of the present invention, further comprising steps of:

receiving input information from a user, and setting a priority for the uncertainty information.

In practical application, by setting a priority for the uncertainty information, the present invention is obviously different from the input method of the prior art, wherein the priority affects the efficiency and the matching effect.

Specifically, by setting a priority for the uncertainty information, it will be more quick and convenient to find the Chinese characters to be input on the screen. Moreover, different types of uncertainty information exhibit different levels of importance in matching different Chinese characters to be input.

For example, if three types of uncertainty information including the location information, the phonetic alphabet information and the tone information are utilized, it can configure a priority for the above three types of information in advance. Specifically, it may be arranged such that the location information has the primary priority and thus will take primary precedence on execution; the phonetic alphabet information has the secondary priority and thus will take secondary precedence on execution; and the tone information has the lowest priority and will be the last executed operation.

When it is expected to input the Chinese character "嚼" from the phrase "味同嚼蜡", the technical solution according to the present invention provides a user with plenty of ways to determine the character "嚼" to be input. For example, the user can determine the character by means of the pronunciation information, the radical information, the tone information, the structural configuration information and the location information, etc. For instance, if the uncertainty information input by the user includes: the character is left-side structured with "爵" in its right portion, and the character is pronounced at the second tone; the Chinese character to be input may be "嚼" from phrase "味同嚼蜡", or may be "爝" from phrase "精神爝火". If the location information "味同 蜡" is further input, it will still be difficult to distinguish "味同 蜡" from "精神 火" simply based on the information "the character to be input occupies the third position in the possible phase" indicated by the location information; but it will be easy to exclude the candidate character "爝" based on the information "味同" and "蜡" contained in the location information.

Further, for example, when a user is very confident in finding a Chinese character through its pronunciation, he/she may preset the tone information and/or homophone information with a higher priority; when a user is better at finding a Chinese character through handwriting, he/she may preset the structural configuration information and/or radical information in the uncertainty information with a higher priority.

Input examples and processing flow thereof under different types of solutions will be illustrated as below.

Scenario: a user, who wants to input a Chinese text including four Chinese characters "味同嚼 蜡" on a handwriting input interface, forgets how to exactly write the character "嚼".

Solution 1: the input scene of the user may be as follows: input scene: "味同 jiao 蜡".

Solution 2: the input scene of the user may be as follows: input scene: "味同 jiao 蜡", and it is also displayed that the input "jiao" is pronounced at the second tone.

Solution 3: the input scene of the user may be as follows: input scene: "味同 jiao 蜡", and it is also displayed that the character to be input is left-right structured.

Solution 4: the input scene of the user may be as follows: input scene: "味同 jiao 蜡", and it is also displayed that the character to be input is left-right structured and the input "jiao" is pronounced at the second tone.

Solution 5: the input scene of the user may be as follows: input scene: "味同交蜡", and it is also displayed that the input "交" is pronounced at the second tone.

Solution 6: the input scene of the user may be as follows: input scene: "味同交蜡", and it is also displayed that the input character "交" is left-right structured and is pronounced at the second tone.

Solution 7: the input scene of the user may be as follows: input scene: "味同交蜡", and it is also displayed that the input character "交" is left-right structured.

Solution 8: the input scene of the user may be as follows: input scene: "味同 蜡", and it is also displayed that the missing character is left-right structured and has a glyph "爵" in its right portion.

In certain cases, a user may forget how to write more than one character from a phrase to be input. Again, taking the phrase "味同嚼蜡" as an example.

Solution 9: the input scene of the user may be as follows: input scene: "味同 jiao la".

Under various input scenes illustrated above, when inputting calligraphy data in a certain format, the processing flow may be as follows:

Step 1: The calligraphy points input by the user are received by a receiving module, and transmitted to a preprocessing module for necessary preprocessing to obtain better recognition results.

Step 2: A boundary for each character is determined by a segmenting module.

Step 3: Calligraphy points pertaining to uncertainty information are recognized from the preprocessed calligraphy data points, and then separated from other calligraphy points pertaining to the Chinese text, by an uncertainty information detecting module.

Step 4: At least one type of uncertainty information is separated from the calligraphy points pertaining to uncertainty information as determined in step 2, by a phonetic alphabet character string detecting module/phonetic alphabet tone detecting module/structural configuration information detecting module/radical detecting module/homophone detecting module.

Step 5: The information that is separated in step 3 is recognized by a phonetic alphabet recognizing module/phonetic alphabet tone recognizing module/structural configuration category recognizing module/radical recognizing module/homophone recognizing module (i.e., Chinese character recognizing module).

Step 6: The calligraphy points pertaining to the Chinese text that are separated in step 2 are recognized to obtain candidate Chinese characters.

Step 7: The recognition results of the homophone recognizing module are required to be converted into phonetic alphabet strings by a Chinese character-to-phonetic alphabet converting module.

Step 8: The phonetic alphabet strings that are recognized in step 4 and the phonetic alphabet strings that are converted in step 6 are required to be processed by a phonetic alphabet plus tone-to-character converting module, so as to be converted into candidate Chinese characters. If the tone information is missing, this step performs a phonetic alphabet-to-character conversion, instead.

Step 9: The structural configuration information that is recognized in step 4 is required to be converted into candidate Chinese characters by a structural configuration category-to-character converting module.

Step 10: The Chinese characters that are obtained from step 7 and step 8 are screened according to the recognition results of the radical recognizing module, and re-scored and sorted by a character screening and merging module, in order to obtain a group of candidate Chinese characters.

Step 11: The candidate Chinese characters obtained from step 9 are combined with the candidate contexts obtained from step 5 to constitute phrases; these phrases are sorted from high to low in terms of scores calculated through language models, so as to output candidate phrases/sentences.

Step 12: The results are output.

In case that the available information for each character location at least contains either phonetic alphabet or Chinese character as shown in above solutions 1-7, another processing method, among the foregoing ones, is to convert all the input information into phonetic alphabets and Chinese characters, then to recognize and score the character strings under both a phonetic alphabet model and a Chinese character model, and finally to merge the respectively obtained candidate characters into a uniform candidate sequence for output. The particular processing flow may be as follows:

Step 21: Calligraphy points input by the user are received by the receiving module and transmitted to the preprocessing module for necessary preprocessing to obtain better recognition results.

Step 22: A boundary for each character is determined by the segmenting module.

Step 23: Each character obtained from step 22 is converted into Chinese character. If the character location itself is input as a Chinese character, the candidate Chinese characters are sorted based on confidence coefficient, after recognition. If the character location itself is input as phonetic alphabet, candidate Chinese characters are generated based on recognition results of the phonetic alphabet string. The conversion results shall make sure that each character location corresponds to at least one candidate Chinese character.

Step 24: The results of step 23 are merged and spliced by the character screening and merging module and a scoring function of a language-model scoring module for Chinese character language model, so as to obtain candidate phrases.

Step 25: Each character in the results obtained from step 22 is converted into phonetic alphabet. If the character location itself is input as phonetic alphabet, the recognized phonetic alphabet string is output. If the character location itself is input as a Chinese character, regardless of whether this Chinese character is an exactly right one or a homophone, the recognized candidate Chinese character is converted into candidate phonetic alphabet string by the Chinese character-to-phonetic alphabet converting module. The conversion results shall make sure that each character location corresponds to at least one candidate Chinese character.

Step 26: The results of step 25 are merged and spliced by the scoring function of the language-model scoring module for phonetic alphabet string model, so as to obtain candidate phrases.

Step 27: The results of step 24 and step 25 are merged by a candidate screening and merging module according to merging rules as follows:

A. if the sequence contains a same candidate phrase, bringing this candidate phrase advance;

B. counting the occurrence frequency of characters for each candidate phrase, and if a candidate phrase contains more characters with higher occurrence frequency than others, bringing this candidate phrase advance;

C. merging two candidate phrases from two candidate sequences into one candidate sequence, according to respective scores of the candidate phrases.

Step 28: The merging results are output.

Figure 4:
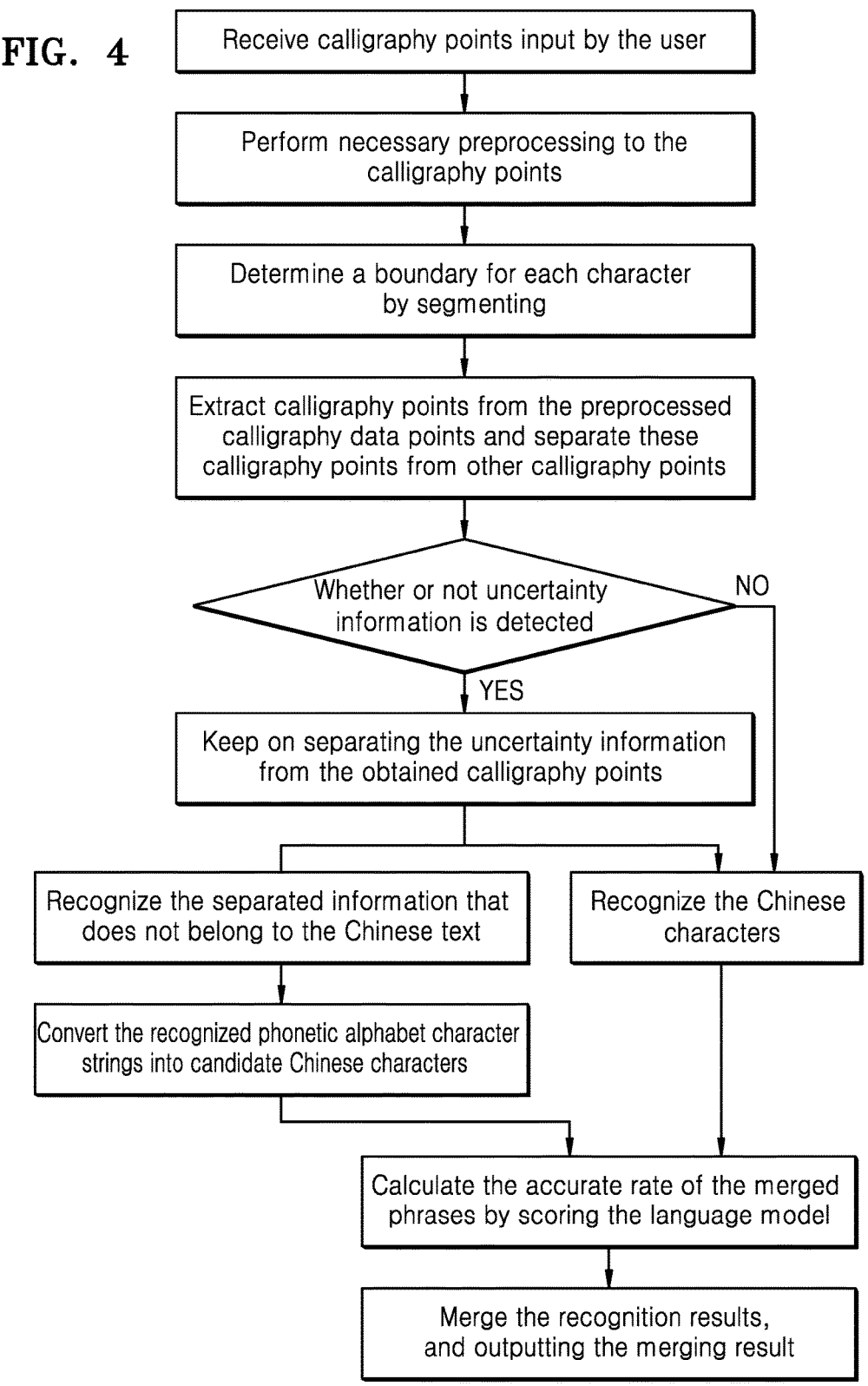
FIG. 4 is a flowchart of solution 1 in the method for realizing Chinese character input based on uncertainty information according to another embodiment of the present invention.

FIG. 4 is a flowchart of solution 1 of a method for realizing Chinese character input based on uncertainty information according to another embodiment of the present invention. As shown in FIG. 4, in particular, the flow of solution 1 of the method for realizing Chinese character input based on uncertainty information according to another embodiment of the present invention comprises steps of:

receiving calligraphy points input by the user;

performing necessary preprocessing to the calligraphy points, in order to obtain better recognition results;

determining a boundary for each character by segmenting;

extracting the calligraphy points pertaining to uncertainty information from the preprocessed calligraphy data points, and then separating the calligraphy points pertaining to uncertainty information from other calligraphy points pertaining to the Chinese text;

detecting the uncertainty information; if any uncertain information is detected, performing corresponding operation, including: keeping on separating the uncertainty information from the obtained calligraphy points pertaining to uncertainty information, by means of phonetic alphabet character information; recognizing the separated information that does not belong to the Chinese text by the phonetic alphabet recognizing module; converting the recognized phonetic alphabet character string into candidate Chinese characters, by means of a phonetic alphabet-to-character conversion; sending the candidate Chinese characters into a phonetic alphabet string language model to calculate the accurate rate of the merged phrases by scoring the language model according to the counted Chinese phrases/phonetic alphabet strings and the occurrence frequency thereof; merging the recognition results, and outputting the merging result;

if no uncertainty information is detected, recognizing the Chinese characters, i.e., recognizing Chinese-text characters from which the uncertainty information has been separated and recognizing the homophones in the uncertainty information; sending the recognition results into the Chinese character language model to calculate the accurate rate of the merged phrases by scoring the language model according to the counted Chinese phrases/phonetic alphabet strings and the occurrence frequency thereof; merging the recognition results, and outputting the merging result.

Solution 1, taking the phonetic alphabet string as the one and unique uncertainty information, is the simplest one among the total nine solutions. This solution is just the only solution to solve the problem of forgetting how to exactly write a Chinese character in the existing input mode.

Figure 5:
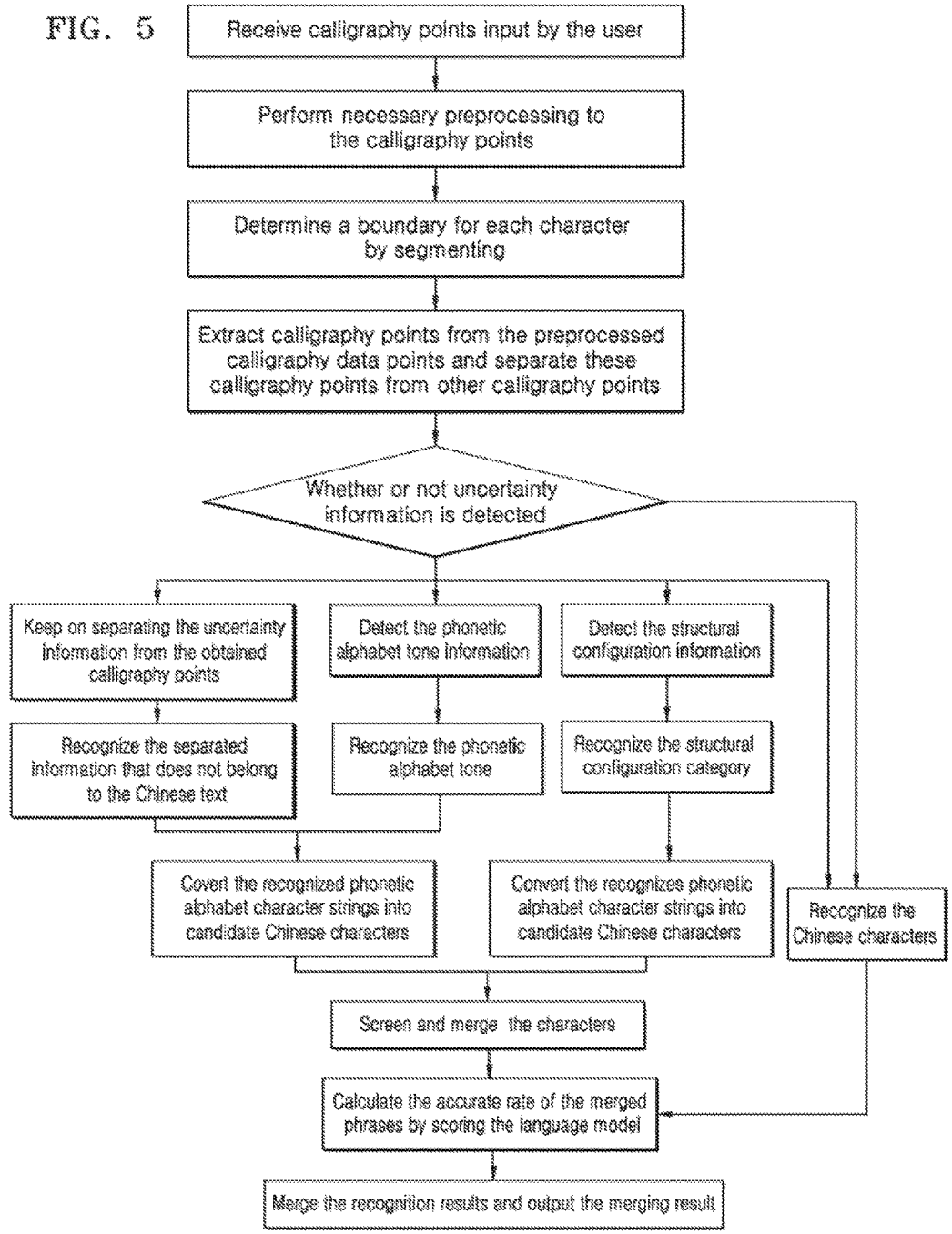
FIG. 5 is a flowchart of solution 4 in the method for realizing Chinese character input based on uncertainty information according to another embodiment of the present invention.

FIG. 5 is a flowchart of solution 4 of a method for realizing Chinese character input based on uncertainty information according to another embodiment of the present invention. As shown in FIG. 5, in particular, the processing flow of solution 4 of the method for realizing Chinese character input based on uncertainty information according to another embodiment of the present invention comprises steps to be described as below.

Solution 4 is a relatively complex one among the total nine solutions above, comprising three types of uncertainty information including the phonetic alphabet string, the phonetic alphabet tone and the structural configuration. It shares the processing flow with solution 1 as shown in FIG. 4, while the only difference is incorporating both the detected phonetic alphabet tone information and structural configuration information into the uncertainty information which already contains the phonetic alphabet string. Thus it is unnecessary to go into details herein.

Due to the incorporation of other two types of uncertainty information, a process to screen and merge the characters will be introduced, comprising: sorting the candidate sequences which are obtained from different process modes on different basis (phonetic alphabet or Chinese character) under the same input, in order to generate a uniform candidate sequence.

Comparing with solution 1, solution 4 involves more types of information and thus more uncertainty information. As a result, it can narrow the collection of characters determined from the uncertainty information as far as possible, so as to narrow the number of phrases constituted by said character and the context, and to further reduce the computation time for scoring the language model, thereby improving the calculation accuracy and the overall system performance.

In the embodiment above, by a step of firstly receiving input information from a user, a step of extracting at least two types of uncertainty information of Chinese characters to be input, from the input information, and a step of determining the matched Chinese characters according to the at least two types of uncertainty information and outputting the matched Chinese character, it allows a user who just has incomplete memory of pronunciation or glyph information of the Chinese character to be input to realize correct input of the Chinese character by defining a certain range for candidate characters corresponding to the Chinese character to be input, in combination with at least two types of extracted uncertainty information of the Chinese character to be input, wherein the uncertainty information includes, for example, phonetic alphabet (Pinyin) information, tone information, structural configuration information, radical information, homophone information, and location information.

The embodiments of the present invention, on another aspect, provide a method for realizing Chinese character input based on uncertainty information, comprising steps of:

receiving input information from a user;

extracting uncertainty information of Chinese characters to be input, from the input information, wherein the uncertainty information includes any one or more types of the following information:

tone information, structural configuration information, radical information, homophone information, and location information; and, determining and outputting the Chinese character to be input based on the determined Chinese characters and the uncertainty information.

In an embodiment of the present invention, it can correctly and quickly determine the Chinese character to be input by means of the predetermined Chinese characters such as the context content of the Chinese character to be input, in combination with one or more type of uncertainty information including tone information, structural configuration information, radical information, homophone information, or location information. That is to say, the solution as provided by the present embodiment can realize Chinese character input even based on only one type of uncertainty information.

Specifically, for example, when it is expected to input four Chinese characters "味同嚼蜡", if the user has determined the Chinese characters "味同" and "蜡" from the phrase but forgets how to exactly write the Chinese character "嚼", he/she can easily determine the forgotten one is "嚼" by combining with any one or more type of uncertainty information thereof, including tone information, structural configuration information, radical information, homophone information, or location information; for example, the phonetic alphabet for this Chinese character is pronounced at the second tone, or, this Chinese character is left-right structured, or, this Chinese character has a homophone written as "交" among others, or, this Chinese character occupies the third position in the phrase. In other words, the method can correctly and quickly output the Chinese character "嚼" to be input, based on the predetermined Chinese characters (the first and second ones arranged in an order of "味同", and the fourth one "烛") in combination with the uncertainty information (the phonetic alphabet for this Chinese character is pronounced at the second tone, or, this Chinese character is left-right structured, or, this Chinese character has a homophone written as "交" among others, or, this Chinese character occupies the third position in the phrase).

In the present application scenario, as comparison with the foregoing solutions in which the Chinese character is matched and outputted based on at least two types of uncertainty information, the present solution takes full advantageous of the predetermined context content of the Chinese character to be input, by a step of receiving input information from a user, a step of extracting uncertainty information of Chinese characters to be input, from the input information, wherein the uncertainty information includes any one or more types of tone information, structural configuration information, radical information, homophone information, and location information, and a step of determining and outputting the Chinese character to be input based on the determined Chinese characters and the uncertainty information, so as to correctly and quickly determine and output the Chinese character to be input simply based on any one type of tone information, structural configuration information, radical information, homophone information, or location information.

The process of determining and outputting the Chinese character to be input based on the predetermined Chinese characters and the uncertainty information in the present embodiment is similar with the process of determining and outputting the matched Chinese character based on at least two types of uncertainty information in the foregoing embodiments, which have been described in details as above, thus the foregoing embodiments in the solutions of determining and outputting the matched Chinese character based on at least two types of uncertainty information are also applicable for the solution of determining and outputting the Chinese character to be input based on the determined Chinese characters and the uncertainty information in the present embodiment. It is therefore unnecessary to go into details herein, and reference may be made to the corresponding description.

Figure 6:
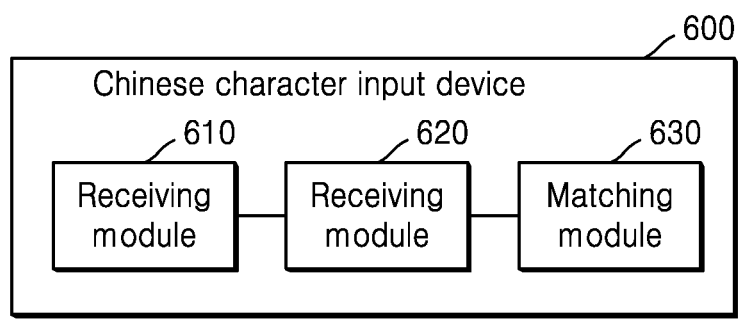
FIG. 6 is a structural diagram illustrating a device for realizing Chinese character input based on uncertainty information according to an embodiment of the present invention.

FIG. 6 is a structural diagram illustrating a device 600 for realizing Chinese character input based on uncertainty information according to an embodiment of the present invention. As shown in FIG. 6, the device 600 for realizing Chinese character input based on uncertainty information in the present embodiment comprises a receiving module 610, an extracting module 620 and a matching module 630.

The receiving module 610 is configured for receiving input information from a user.

As an embodiment of the present invention, the receiving module 610 receives input information from a user by steps of:
detecting an user operation within an input area; and
recording at least two types of uncertainty information input by a user operation.

Specifically, the receiving module 610 is configured for receiving the tone information by any one of the following ways:
receiving tone symbols input by a user through handwriting corresponding to the tone information, the tone symbols including ,´ , or ;
receiving a certain number or letter indicative of the tone information.

Specifically, the receiving module 610 is configured for receiving the location information by any one of the following ways:
receiving a blank or a certain character input by the user.

The extracting module 620 is configured for extracting at least two types of uncertainty information of Chinese characters to be input, from the input information.

Specifically, the uncertainty information extracted by the extracting module 620 includes any one or more types of the following information:
phonetic alphabet information, tone information, structural configuration information, radical information, homophone information, and location information. Wherein, the phonetic alphabet information includes: phonetic alphabet character string information for separating phonetic alphabet strings according to calligraphy characteristic and writing area of handwriting; and, phonetic alphabet tone information for separating phonetic alphabet tones according to calligraphy characteristic and writing area of the handwriting of phonetic alphabet tone. The structural configuration information is used for separating the structural configuration information according to calligraphy characteristic and writing area of the structural configuration information. The radical information is used for separating radicals which can be determined by the user according to calligraphy characteristic and writing area of the structural configuration information. The homophone information is used for separating the homophone information according to calligraphy characteristic and writing area of the handwriting of homophone.

The matching module 630 is configured for determining a matched Chinese character according to the at least two types of uncertainty information and outputting the matched Chinese character.

Specifically, the matching module 630 determines a matched Chinese character according to the at least two types of uncertainty information and outputs the matched Chinese character by steps of:
selecting corresponding models according to the at least two types of uncertainty information;
matching the Chinese characters to be input in at least two types of corresponding models;
analyzing matching results for each of the at least two types of corresponding models, determining Chinese characters with a highest matching degree as the Chinese characters to be input; and,
outputting the Chinese characters with a highest matching degree.

Specifically, the matching module 630 is further configured for:
determining a priority for the uncertainty information; and
matching the Chinese characters to be input in a sequence according to the priority, in the corresponding model.

In the embodiment mentioned above, by a step of receiving input information from a user, a step of extracting at least two types of uncertainty information of Chinese characters to be input, from the input information, and a step of determining the matched Chinese characters according to the at least two types of uncertainty information and outputting the matched Chinese characters; it allows a user who just has incomplete memory of pronunciation or glyph information of the Chinese characters to be input to realize correct input of Chinese character by defining a certain range for candidate characters corresponding to the Chinese characters to be input, in combination with at least two types of extracted uncertainty information of the Chinese characters to be input, wherein the uncertainty information includes, for example, phonetic alphabet (Pinyin) information, tone information, structural configuration information, radical information, homophone information, and location information.

Figure 7:
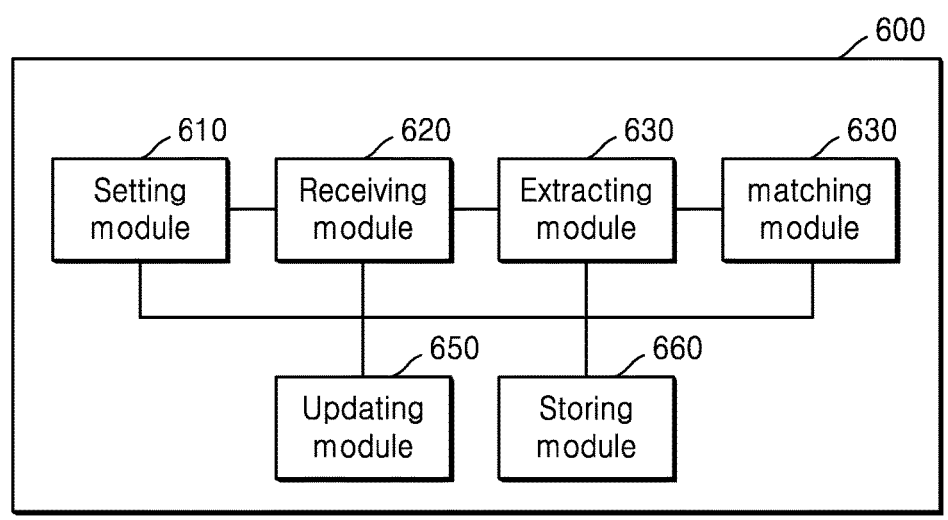
FIG. 7 is a structural diagram illustrating a device for realizing Chinese character input based on uncertainty information according to another embodiment of the present invention.

FIG. 7 is a structural diagram illustrating a device for realizing Chinese character input based on uncertainty information according to another embodiment of the present invention. As shown in FIG. 7, in the present embodiment, the device for realizing Chinese character input based on uncertainty information further comprises: a setting module 640, an updating module 650 and a storing module 660.

As an embodiment of the above device for realizing Chinese character input based on uncertainty information, the setting module 640 is configured for receiving input information from a user and setting a priority for the uncertainty information.

Further, as an embodiment of the above device for realizing Chinese character input based on uncertainty information, the updating module 650 is configured for displaying the updated uncertainty information on the screen when detecting a modification of the uncertainty information by the user within an input area.

Further, the storing module 660 is configured for storing input information of the user, including, for example, calligraphy points input by a user through handwriting, language models, a mapping table between phonetic alphabet and Chinese character, as well as recognition library of Chinese character and phonetic alphabet.

Additionally, the processor contained in the device according to the present embodiment further provides the following functions:

performing necessary preprocessing procedures on the information which is input by the user and received by the receiving module 610, including: preprocessing, denoising, and tilt correction, etc.;

recognizing a boundary for each character by segmenting;

distinguishing the uncertainty information from the Chinese text in the information input by the user, according to the format of the uncertainty information extracted by the extracting module 620;

obtaining phonetic alphabet character strings according to the calligraphy of phonetic alphabet, so as to recognize the phonetic alphabet calligraphy information;

obtaining structural-configuration category according to the calligraphy of structural configuration, so as to recognize the structural configuration information;

recognizing the phonetic alphabet tones, the radicals and the homophones;

recognizing the characters in the Chinese text from which the uncertainty information has been separated, and recognizing the homophones in the uncertainty information, so as to recognize corresponding Chinese characters;

based on recognition results of Chinese character, obtaining corresponding phonetic alphabet strings of the recognized Chinese character by means of a "Chinese character-to-phonetic alphabet" conversion through table lookup;

based on a mapping table between the combined information of phonetic alphabet string with tone (phonetic alphabet string+tone) and the Chinese character, obtaining conversion results of a "phonetic alphabet plus tone-to-character" conversion through table lookup;

based on recognition results of structural configuration category, mapping the recognized structural configuration category into a character collection corresponding to the category by means of a "structural configuration category-to-character" conversion through table lookup;

a process of screening and merging characters, comprises: screening (according to recognition results of radical, if existed) a character collection derived from the uncertainty information of different types (phonetic alphabet, structural configuration, homophone), and merging the screened characters (according to a group of scores sorted from high to low, which is obtained by scoring in terms of weights), so as to screen and sort the candidate characters obtained based on different types of uncertainty information;

a process of screening and merging the candidate characters, comprising: sorting more than one candidate sequence obtained on different basis, according to certain rules, and merging these sorted ones into a candidate sequence for final output.

a process of scoring language model, comprising a process of scoring the Chinese character language model and a process of scoring the phonetic alphabet string language model, which provide the following functions: combining the candidate Chinese character corresponding to the phonetic alphabet or the candidate phonetic alphabet string corresponding to the Chinese character, with the Chinese character or phonetic alphabet string of the context; scoring different combinations in this module such that the combination with a higher score has a higher ranking, so as to calculate the accurate rate of the spliced phrase according to the counted Chinese phrases/phonetic alphabet strings and the occurrence frequency thereof by model scoring.

In the embodiment above, by a step of receiving input information from a user, a step of extracting at least two types of uncertainty information of Chinese characters to be input, from the input information, and a step of determining the matched Chinese characters according to the at least two types of uncertainty information and outputting the matched Chinese characters, it allows a user who just has incomplete memory of pronunciation or glyph information of the Chinese characters to be input to realize correct input of Chinese character by defining a certain range for candidate characters corresponding to the Chinese characters to be input, in combination with at least two types of extracted uncertainty information of the Chinese characters to be input, wherein the uncertainty information includes, for example, phonetic alphabet (Pinyin) information, tone information, structural configuration information, radical information, homophone information, and location information.

The embodiments of the present invention, on another aspect, provide a device for realizing Chinese character input based on uncertainty information, comprising a receiving module, an extracting module and a matching module:

the receiving module is configured for receiving input information from a user;

the extracting module is configured for extracting uncertainty information of Chinese characters to be input, from the input information, wherein the uncertainty information includes any one or more types of the following information:

tone information, structural configuration information, radical information, homophone information, and location information;

the matching module is configured for determining and outputting the Chinese characters to be input based on the determined Chinese characters and the uncertainty information.

The process for the matching module to determine and output the Chinese characters to be input based on the determined Chinese characters and the uncertainty information in the present embodiment is similar with the process of determining and outputting the matched Chinese characters based on at least two types of uncertainty information in the foregoing embodiments of method or device, which have been described in details as above, thus the foregoing embodiments in the solutions of determining and outputting the matched Chinese characters based on at least two types of uncertainty information are also applicable for the solution of determining and outputting the Chinese characters to be input based on the determined Chinese characters and any one more type of the uncertainty information in the present embodiment. It is therefore unnecessary to go into details herein, and reference may be made to the corresponding description.

Figure 8:
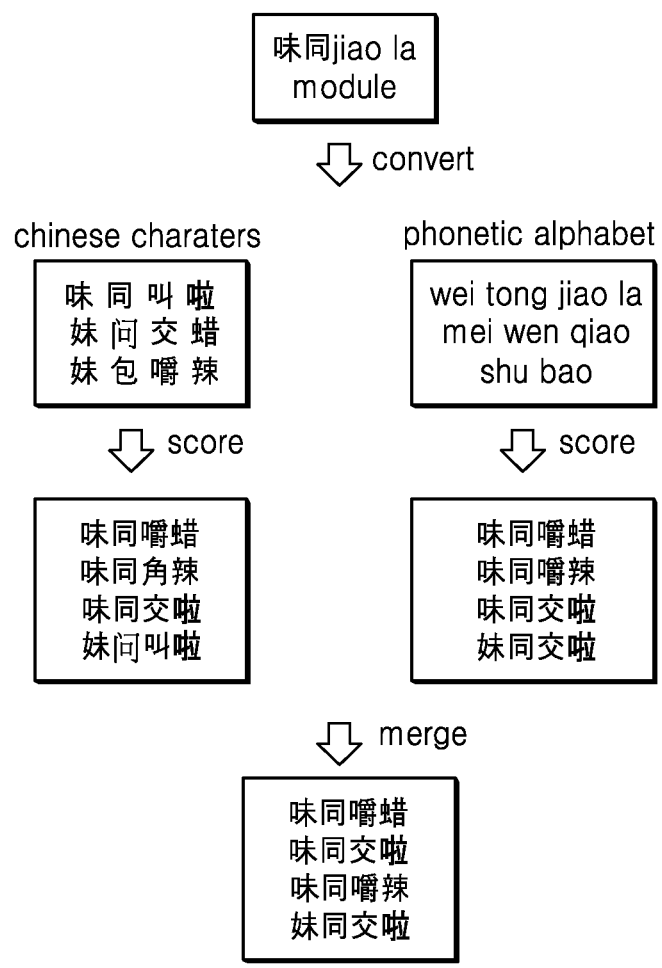
FIG. 8 is a schematic diagram illustrating a process of determining Chinese characters with the highest matching degree based on uncertainty information.

FIG. 8 is a schematic diagram illustrating a process of determining Chinese characters with the highest matching degree based on uncertainty information in a case where the available information for each character location at least includes either phonetic alphabet or Chinese character, comprising the processing flow described as below.

Corresponding models are selected according to the at least two types of uncertainty information, of which the particular processing flow will be described with following examples.

Input information "味同 jiao la" is received and converted into Chinese characters and phonetic alphabet strings, respectively, for purpose of taking full advantageous of available information as far as possible; modeling analysis is performed on the input uncertainty information under the Chinese character model and the phonetic alphabet model, respectively, to obtain respective results; and the results are merged to improve the reliability of the results.

The Chinese characters or phonetic alphabet strings obtained by conversion during the above process are displayed.

Specifically, if the Chinese character language model is selected according to the at least two types of uncertainty information contained in "味同 jiao la", the following processing flow is performed:

matching the Chinese characters "味同 jiao la" to be input in the Chinese character language model, the possible results including"味同叫啦", "妹问交蜡" and "妹包嚼辣"; and inputting all of the information containing the above Chinese characters "味同叫啦", "妹问 交蜡" and "妹包嚼辣" into the Chinese character language model for matching, the possible combinations of Chinese characters including "味同嚼蜡", "味同角辣", "味同交 啦", or "味问叫啦".

Specifically, if the phonetic alphabet string language model is selected according to the at least two types of uncertainty information contained in "味同 jiao la", the following processing flow is performed:

matching the Chinese characters "味同 jiao la" to be input, in the phonetic alphabet string language model, in which step, "味同 jiao la" may be converted into phonetic alphabet strings as follows: "wei tong jiao la", "mei wen qiao" and "shu bao";

inputting all of the information containing the above phonetic alphabet strings "wei tong jiao la", "mei wen qiao" and "shu bao" into the phonetic alphabet string language model for matching, the possible combinations of Chinese characters including "味同嚼蜡", "味同嚼辣", "味同交 啦", and "妹 啦".

Two candidate sequences are merged according to certain rules. For example, it is determined whether there are same results in the character strings obtained under the two models, if so, the same results are placed into the merged sequence. As shown in the example, if the two character strings both contain "味同嚼蜡", "味同嚼蜡" is used as the first candidate character string of the merging result. Likewise, if the two character strings both contain "味同交啦", "味同交啦" is used as the second candidate character string of the merging result. Subsequently, if the two character strings no longer contain any same result, the character strings, which are contained in either of the two sequences only, are sorted from high to low in terms of scores, according to scoring rules as designed. For example, it may be possible to directly sort the scores of the two models, or, it may be possible to translate the scores of the two models into unified score by calculating weighted parameters according to the model parameters, and then to uniformly sort the remaining character strings based on the translated scores. The following merging results may be obtained: "味同嚼蜡", "味 啦", "味同嚼辣", and "妹 啦".

The above matching results of the Chinese character language model and the phonetic alphabet string language model are analyzed, to determine the Chinese characters with the highest matching degree as the Chinese characters to be input, and the Chinese characters with the highest matching degree, that is, "味同嚼蜡", are output.

As an embodiment of the present invention, in practical application, the foregoing device for realizing Chinese character input based on uncertainty information is usually implemented by a terminal device, including the device for realizing Chinese character input based on uncertainty information as shown in FIG. 6 or FIG. 7.

The foregoing solutions as provided by the present invention allow a user, who has incomplete memory of pronunciation or glyph information of Chinese characters to be input, to realize correct input of Chinese character by defining a certain range for candidate characters corresponding to the Chinese characters to be input, in combination with at least two types of extracted uncertainty information of the Chinese characters to be input. In addition, the above solutions as provided by the present invention just make minor modification to the existing systems, and hence will not influence the system compatibility. Moreover, the implementations of these solutions as provided are both simple and highly effective.

It should be appreciated by the person skilled in the art that the present invention may involve devices for implementing one or more operations described therein. The device may be designed and manufactured for dedicated purposes as required, or may further comprise well known devices found in general-purpose computers which are activated or reconstituted selectively by the programs stored therein. Such computer programs may be stored in device (such as a computer) readable media or stored in any type of medias adaptive to store electronic instructions and coupled to a bus. Such computer readable media includes, but not limited to, any type of disks/discs (including floppy disk, hard disk, optical disk, CD-ROM and magneto optical disk), read-only memory (ROM), random access memory (RAM), Erasable programmable Read-Only Memory (EPROM), electrically erasable ROM (EEPROM), flash memory, magnetic card or fiber card. That is to say, the readable media includes any mechanism storing or transmitting information in device (for example, the computer) readable form.

It should be appreciated by the person skilled in the art that each block as well as the combination of the blocks in the structural block graphs and/or block graphs and/or flowcharts may be implemented through computer program instructions. It should be appreciated by the person skilled in the art that these computer program instructions may be provided to general-purpose computer, dedicated computer or other processors capable of programming the data processing methods, to generate machines, so as to implement the methods specified in the block(s) of the structural block graphs and/or block graphs and/or flowcharts through the instructions executed on the computer or other processors capable of programming the data processing methods.

It should be appreciated by the person skilled in the art that the various operations, methods, steps in the flow, measures and schemes discussed in the present invention can be alternated, modified, combined or deleted. Furthermore, other operations, methods, steps in the flow, measures and schemes involving the various operations, methods, steps in the flow, measures and schemes discussed in the present invention may also be alternated, modified, rearranged, dissolved, combined or deleted. Furthermore, other operations, methods, steps in the flow, measures and schemes having the same functions with the various operations, methods, steps in the flow, measures and schemes discussed in the present invention may also be alternated, modified, rearranged, dissolved, combined or deleted.

The description above only illustrates part of the embodiments of the present invention. It should be pointed out that, various modifications and polishes may be made by a person skilled in the art without departing from the principle of the present invention. These modification and polishes shall also be regarded as the extent of protection of the present invention.

What is claimed is:

1. A method for providing Chinese character based on handwriting input, comprising:
   receiving a text string including one or more Chinese characters, one or more phonetic alphabets and one or more blanks from a handwriting input interface, wherein the one or more phonetic alphabets and/or the one or more blanks correspond to one or more uncertain Chinese characters;
   recognizing information on the one or more Chinese characters;
   extracting at least two types of uncertainty information on the uncertain Chinese characters based on the information on the one or more Chinese characters, wherein each of the at least two types of uncertainty information has a predetermined priority respectively;
   determining certain Chinese characters each of which corresponds to each of the uncertain Chinese characters according to at least two types of language models based on the at least two types of uncertainty information by matching the certain Chinese characters in a sequence according to the predetermined priority, wherein each of the language models is scored by scoring a Chinese character language model or scoring a phonetic alphabet language model; and
   outputting the certain Chinese characters.

2. The method for claim 1, wherein the at least two types of uncertainty information includes at least two of phonetic alphabet (Pinyin) information, tone information, structural configuration information, radical information, homophone information, and location information.

3. The method for claim 2, wherein the tone information is extracted by:
   extracting tone symbols corresponding to the tone information, the tone symbols including ,´ , or ; or
   extracting a certain number or letter indicative of the tone information.

4. The method for claim 2, wherein the location information is extracted by extracting a blank or a certain character.

5. The method for any one of claims 2-4, wherein the recognizing information on the one or more Chinese characters comprises:
   detecting a user operation within an input area; and
   recording at least two types of uncertainty information input by the user operation.

6. The method for claim 5, further comprising:
   displaying the at least two types of uncertainty information on a screen.

7. The method for claim 2, wherein the determining the certain Chinese characters comprises:
   analyzing matching results for each of the at least two types of language models to determine the certain Chinese characters with a highest matching degree; and
   wherein outputting the certain Chinese characters comprises outputting the certain Chinese characters with the highest matching degree.

8. The method for claim 7, further comprising:
   determining a priority for the at least two types of uncertainty information; and
   matching the certain Chinese characters in a sequence according to the priority with the at least two types of corresponding models.

9. A device for providing Chinese character based on handwriting input, comprising a processor to implement:
   a communicator configured to receive a text string including one or more Chinese characters, one or more phonetic alphabets, and one or more blanks from a handwriting input interface, wherein the one or more phonetic alphabets and/or the one or more blanks correspond to one or more uncertain Chinese characters; and
   a controller configured to:
      recognize information on the one or more Chinese characters;
      extract at least two types of uncertainty information on the uncertain Chinese characters based on the information on the one or more Chinese characters, wherein each of the at least two types of uncertainty information has a predetermined priority respectively,
      determine certain Chinese characters each of which corresponds to each of the uncertain Chinese characters according to at least two types of language models based on the at least two types of uncertainty information by matching the certain Chinese characters in a sequence according to the predetermined priority, wherein each of the language models is scored by scoring a Chinese character language model and a phonetic alphabet language model, and output the certain Chinese characters.

10. The device for claim 9, wherein the at least two types of uncertainty information extracted by the controller includes at least two of phonetic alphabet (Pinyin) information, tone information, structural configuration information, radical information, homophone information, and location information.

11. The device for claim 10, wherein the controller is further configured to extract the tone information by:
    extracting tone symbols corresponding to the tone information, the tone symbols including ,´ , or ; or
    extracting a certain number or letter indicative of the tone information.

12. The device for claim 10, wherein the controller is further configured to extract the location information by extracting a blank or a certain character.

13. The device for any one of claims 10-12, wherein the controller is further configured to recognize the one or more Chinese characters by:
    detecting a user operation within an input area; and
    recording the at least two types of uncertainty information input by the user operation.

14. The device for claim 13, wherein the controller is further configured to display the at least two types of uncertainty information on a screen.

15. The device for claim 14, wherein the controller is further configured to display updated uncertainty information on the screen when detecting a modification of the at least two types of uncertainty information by a user within an input area.

16. The device for claim 10, wherein the controller is further configured to:
    analyze matching results for each of the at least two types of language models to determine the certain Chinese characters with a highest matching degree, and
    wherein the certain Chinese characters output by the controller are the certain Chinese characters with the highest matching degree.

17. The device for claim 16, wherein the controller is further configured to:
    determine a priority for the at least two types of uncertainty information; and
    match the certain Chinese characters in a sequence according to the priority with the at least two types of corresponding models.

18. The device for claim 15, wherein the controller is further configured to:
   receive input information setting a priority for the at least two types of uncertainty information.

\* \* \* \* \*